Sept. 20, 1949.  C. C. VAN NUYS  2,482,304
RECOVERY OF THE CONSTITUENTS OF GASEOUS MIXTURES
Filed Dec. 5, 1946
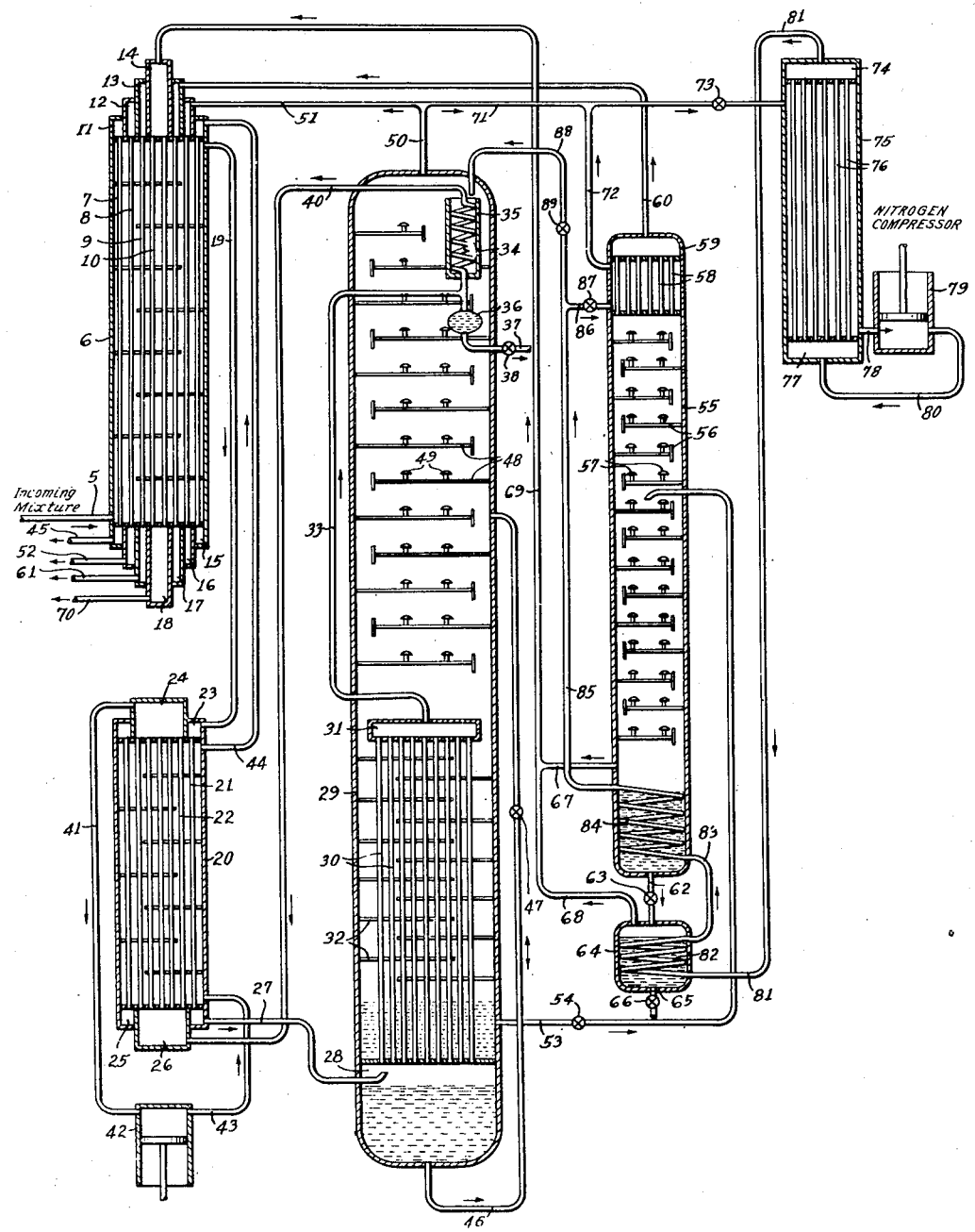
INVENTOR
Claude C. Van Nuys
BY
ATTORNEYS Patented Sept. 20, 1949

2,482,304

UNITED STATES PATENT OFFICE 2,482,304

RECOVERY OF THE CONSTITUENTS OF GASEOUS MIXTURES

Claude C. Van Nuys, Greenwich, Conn., assignor to Air Reduction Company, Incorporated, New York, N. Y., a corporation of New York Application December 5, 1946, Serial No. 714,190

10 Claims. (Cl. 62—175.5)

1

This invention relates to the separation of the constituents of gaseous mixtures by liquefaction and rectification and particularly to the recovery of valuable constituents of gases from the synthesis of ammonia and similar operations in which, as the result of repeated cycling of mixtures including rare gases of the atmosphere, such gases are concentrated and therefore available in substantial proportions.

Thus, for example, in the gases which leave the ammonia condenser after contact in the synthesis bomb with a catalyst to produce ammonia, there is a mixture consisting principally of hydrogen and nitrogen containing often as much as 20% of argon, substantial quantities of neon, krypton and xenon and some methane. The argon, neon and krypton and xenon are valuable products which are present in such gases in much greater proportion than in the atmosphere. The nitrogen and hydrogen are also available for re-use in the ammonia process, and elimination of methane from such gases is desirable.

It is the object of the present invention to provide an effective and economically practicable method of treating gaseous mixtures of the type described to recover the constituents, thereby affording a supply of rare gases of the atmosphere in greater quantities than have been available heretofore.

A further object of the invention is the provision of a useful method of removing undesirable constituents from the gases in the ammonia synthesis cycle, thereby improving the synthesis and coincidentally recovering such constituents as valuable byproducts of the operation.

Other objects and advantages of the invention will be apparent as it is better understood by reference to the following specification and the accompanying drawing, which illustrates diagrammatically an apparatus suitable for the practice of the invention. Elements well known in the art have been omitted from the drawing for the purpose of clarity.

Referring to the drawing, the gaseous mixture, after initial compression to a suitable pressure, for example 5 atmospheres or more, is delivered through a pipe 5 to an exchanger 6. In the exchanger, annular bundles of tubes 7, 8, 9 and 10 are connected to headers 11, 12, 13 and 14, and 15, 16, 17 and 18 at opposite ends of the exchanger. Cold products of the separation pass through the tubes 7, 8, 9 and 10 and serve to cool the incoming gaseous mixture. After such cooling, the gaseous mixture is delivered through a pipe 19 to a second exchanger 20 having bundles of tubes 21 and 22 connected to headers 23, 24, 25 and 26 at opposite ends of the exchanger. The incoming gaseous mixture is delivered to the header 23 and passes through the tubes 21 to the header 25. It is cooled by hydrogen both before and after expansion, which circulates through the exchanger 20 and through the tubes 22.

After cooling in the manner described, the gaseous mixture is delivered by a pipe 27 to a compartment 28 at the bottom of a column 29. It passes upwardly through tubes 30 communicating with the compartment 28 and with a header 31 in heat exchange relation with cold liquid flowing downwardly in the column over baffles 32. As a result, the gaseous mixture is subjected to selective liquefaction of the less volatile constituents, leaving hydrogen and neon in the residue which escapes from the header 31 through a pipe 33 and is delivered to a coil 34 in a receptacle 35 at the top of the column. The receptacle is filled with cold liquid nitrogen supplied in the manner hereinafter described. In the coil 34, any neon present is condensed and flows backwardly into a receptacle 36 from which it may be withdrawn in the liquid phase through a pipe 37 controlled by a valve 38. The hydrogen, still at the initial pressure of the gaseous mixture, is withdrawn through a pipe 40 which is connected to the header 26. The hydrogen passes through the tubes 22 to the header 24, thereby cooling the entering gaseous mixture. The hydrogen is then delivered through a pipe 41 to an expansion engine 42 operating with external work. The hydrogen is expanded and thereby cooled. It is delivered through a pipe 43 to the exchanger 20 and circulates about the tubes therein, thus further cooling the incoming gaseous mixture. The hydrogen then passes through a pipe 44 to the header 11 of exchanger 6, thence through the tubes 7 to the header 15. The hydrogen is withdrawn through a pipe 45 as one of the products of the operation.

The liquid accumulating in the receptacle 28 at the bottom of the column 29 is delivered through a pipe 46 and expansion valve 47 to an intermediate level of the column 29 which is provided with the usual trays 48 and caps 49. The reflux nitrogen for the column comprises the overflow from the receptacle 35 and flows downwardly over the trays 48 in contact with vapors rising through the column as the result of heat exchange of the gaseous mixture in the tubes 30 with the liquid surrounding the tubes. The resulting rectification permits the withdrawal of an effluent consisting of nitrogen through a pipe 50 at the top of the column. The nitrogen is delivered through a pipe 51 to the header 12 and, after passing through the tubes 8, enters the header 16 and escapes through a pipe 52 as one of the products of the operation.

Liquid accumulating about the tubes 30 at the bottom of the column 29 is delivered through a pipe 53 and control valve 54 to an intermediate part of an auxiliary column 55 having the usual trays 56 and caps 57. The liquid flows downwardly over the trays and is supplemented by liquid forming in tubes 58 of a condenser 59 at the top of the auxiliary column. The vapors rising through the tubes 58 are partially condensed by heat exchange with liquid nitrogen supplied as hereinafter described. The gaseous residue, consisting of argon, escapes through a pipe 60 and is delivered to the header 13 of the exchanger 6. After passing through the tubes 9 to the header 17, the argon escapes through a pipe 61 as one of the products of the operation.

The liquid which accumulates in the bottom of the column 55 is partially vaporized therein as hereinafter described. A part of the liquid is withdrawn through a pipe 62 and valve 63 into a compartment 64 where further vaporization occurs. As a result, the liquid is concentrated in krypton and xenon which may be withdrawn as a liquid fraction through a pipe 65 controlled by a valve 66. The vapor from the lower part of the column 55 consists principally of methane. This vapor, together with the methane vapor fraction separated in the compartment 64, is withdrawn through pipes 67 and 68 and delivered by a pipe 69 to a header 14 of the exchanger 6. Passing through the tubes 10, the methane is delivered to the header 18 and escapes through a pipe 70 as one of the products of the separation.

In order to accomplish the necessary separation in the two rectifiers, a portion of the nitrogen from the pipe 50 is diverted through a pipe 71, together with nitrogen from the condenser 59 which escapes through a pipe 72. The pipe 71 is controlled by a valve 73 and delivers the nitrogen to an exchanger 75 having tubes 76 therein communicating with the header 74 and a header 77. The nitrogen passes around the tubes 76 and is delivered by a pipe 78 to a compressor 79 provided with the usual after cooler (not shown). The nitrogen is then delivered by a pipe 80 to the header 77. Passing thence through the tubes 76 to the header 74, the cold nitrogen is delivered by a pipe 81 to a coil 82 in the compartment 64 where it is further cooled and partially liquefied by heat exchange with the liquid in the compartment 64. The coil 82 is connected by a pipe 83 to a coil 84 in the bottom of the column 55, and by heat exchange with the liquid therein the nitrogen is completely liquefied. The liquid nitrogen is delivered by a pipe 85 to a branch pipe 86 controlled by a valve 87 to the condenser 59 affording the supply of liquid nitrogen necessary for the operation of the condenser. The balance of the liquid nitrogen passes through a pipe 88 controlled by a valve 89 to the top of the receptacle 35, supplying the liquid nitrogen necessary for the condensation of neon in the coil 34 and the reflux nitrogen for the column 29.

It will be understood that the column 29 operates at a pressure not greatly in excess of that of column 55, for example from 1½ to 2 atmospheres, whereas column 55 operates at a lower pressure, for example, approximately 1 atmosphere. After initial separation of the hydrogen and neon as described, the successive rectifications eliminate nitrogen and argon respectively in the gaseous phase and finally separate methane from the liquid consisting principally of krypton and xenon. The latter may be further purified by subsequent treatment.

The procedure as described affords an economical and practicable method of recovering relatively large quantities of the rare gases of the atmosphere which otherwise are recoverable only by treating atmospheric air in which the rare gases are present in relatively minute proportions. However, as the result of the cycling of the gases, for example in ammonia synthesis, a concentration of the rare gases occurs and the present method is generally applicable to the recovery of such rare gases while at the same time the removal thereof from the cycle gases improves the ammonia synthesis for which mixtures of nitrogen and hydrogen free from contaminating constituents are desirable.

Various changes may be made in the procedure as described and the apparatus utilized without departing from the invention or sacrificing the advantages thereof.

I claim:

1. The method of recovering the constituents of gaseous mixtures including principally hydrogen and nitrogen with substantial proportions of the atmospheric rare gases which comprises cooling a compressed gaseous mixture with resultant formation of a condensate including constituents less volatile than hydrogen, collecting said condensate, withdrawing the hydrogen, rectifying the condensate to separate nitrogen in the gaseous phase from a liquid including the less volatile constituents and subjecting the liquid to an auxiliary rectification to separate argon in the gaseous phase from a liquid including the less volatile constituents, and selectively evaporating from the last mentioned liquid a more volatile fraction to leave a liquid concentrate containing krypton and xenon.

2. The method of recovering the constituents of gaseous mixtures including principally hydrogen and nitrogen with substantial proportions of the atmospheric rare gases which comprises cooling a compressed gaseous mixture with resultant formation of a condensate including constituents less volatile than hydrogen and neon, collecting said condensate, withdrawing the gaseous residue consisting principally of hydrogen and neon and subjecting it to further cooling to separate neon in the liquid phase, withdrawing the hydrogen, rectifying the condensate to separate nitrogen in the gaseous phase from a liquid including the less volatile constituents and subjecting the liquid to an auxiliary rectification to separate argon in the gaseous phase from a liquid including the less volatile constituents, and selectively evaporating from the last-mentioned liquid a volatile fraction to leave a liquid concentrate containing krypton and xenon.

3. The method of recovering the constituents of gaseous mixtures including principally hydrogen and nitrogen with substantial proportions of the atmospheric rare gases which comprises cooling a compressed gaseous mixture with resultant formation of a condensate including constituents less volatile than hydrogen, collecting said condensate, withdrawing the hydrogen at the initial pressure of the gaseous mixture, passing the withdrawn hydrogen into heat exchange relation with the incoming gaseous mixture to cool the latter, thereafter expanding the hydrogen, passing the expanded hydrogen into heat exchange relation with the incoming gaseous mixture to further cool the latter, rectifying the condensate to separate nitrogen in the gaseous phase from a liquid including less volatile constituents and subjecting the liquid to an auxiliary rectification to separate argon in the gaseous phase from a liquid including the less volatile constituents, and selectively evaporating from the last-mentioned liquid a volatile fraction to leave a liquid concentrate containing krypton and xenon.

4. The method of recovering the constituents of gaseous mixtures including principally hydrogen and nitrogen with substantial proportions of the atmospheric rare gases which comprises cooling a compressed gaseous mixture with resultant formation of a condensate including constituents less volatile than hydrogen and neon, collecting said condensate, withdrawing the gaseous residue consisting principally of hydrogen and neon and subjecting it to further cooling to separate neon in the liquid phase, withdrawing the hydrogen at the initial pressure of the gaseous mixture, passing the withdrawn hydrogen into heat exchange relation with the incoming gaseous mixture to cool the latter, thereafter expanding the hydrogen, passing the expanded hydrogen into heat exchange relation with the incoming gaseous mixture to further cool the latter, withdrawing the hydrogen, rectifying the condensate to separate nitrogen in the gaseous phase from a liquid including the less volatile constituents and subjecting the liquid to an auxiliary rectification to separate argon in the gaseous phase from a liquid including the less volatile constituents, and selectively evaporating from the last-mentioned liquid a volatile fraction to leave a liquid concentrate containing krypton and xenon.

5. The method of recovering the constituents of gaseous mixtures including principally hydrogen and nitrogen with substantial proportions of the atmospheric rare gases, which comprises cooling a compressed gaseous mixture with resultant formation of a condensate including constituents less volatile than hydrogen, collecting said condensate, withdrawing the hydrogen at the initial pressure of the gaseous mixture, passing the withdrawn hydrogen into heat exchange relation with the incoming gaseous mixture to cool the latter, thereafter expanding the hydrogen, passing the expanded hydrogen into heat exchange relation with the incoming gaseous mixture to further cool the latter, and subjecting the condensate to successive rectifications to successively separate nitrogen and argon in the gaseous phase and to leave a liquid concentrate containing krypton and xenon.

6. The method of recovering the constituents of gaseous mixtures including principally hydrogen and nitrogen with substantial proportions of the atmospheric rare gases, which comprises cooling a compressed gaseous mixture with resultant formation of a condensate including constituents less volatile than hydrogen and neon, collecting said condensate, withdrawing the gaseous residue consisting principally of hydrogen and neon and subjecting it to further cooling to separate neon in the liquid phase, withdrawing the hydrogen at the initial pressure of the gaseous mixture, passing the withdrawn hydrogen into heat exchange relation with the incoming gaseous mixture to cool the latter, thereafter expanding the hydrogen, passing the expanded hydrogen into heat exchange relation with the incoming gaseous mixture to further cool the latter, and subjecting the condensate to successive rectifications to successively separate nitrogen and argon in the gaseous phase and to leave a liquid concentrate containing krypton and xenon.

7. The method of recovering the constituents of gaseous mixtures including principally hydrogen and nitrogen with substantial proportions of the atmospheric rare gases which comprises cooling a compressed gaseous mixture with resultant formation of a condensate including constituents less volatile than hydrogen, collecting said condensate, withdrawing the hydrogen at the initial pressure of the gaseous mixture, passing the withdrawn hydrogen into heat exchange relation with the incoming gaseous mixture to cool the latter, thereafter expanding the hydrogen, passing the expanded hydrogen into heat exchange relation with the incoming gaseous mixture to further cool the latter, subjecting the condensate to successive rectifications to successively separate nitrogen and argon in the gaseous phase and to leave a liquid concentrate containing krypton and xenon, and forming liquid nitrogen reflux liquid from the first of said successive rectifications by recompressing a portion of the separated nitrogen and liquefying it by heat exchange with a liquid product of the second of said successive rectifications.

8. The method of recovering the constituents of gaseous mixtures including principally hydrogen and nitrogen with substantial proportions of the atmospheric rare gases which comprises cooling a compressed gaseous mixture with resultant formation of a condensate including constituents less volatile than hydrogen and neon, collecting said condensate, withdrawing the gaseous residue consisting principally of hydrogen and neon and subjecting it to further cooling to separate neon in the liquid phase, withdrawing the hydrogen at the initial pressure of the gaseous mixture, passing the withdrawn hydrogen into heat exchange relation with the incoming gaseous mixture to cool the latter, thereafter expanding the hydrogen, passing the expanded hydrogen into heat exchange relation with the incoming gaseous mixture to further cool the latter, subjecting the condensate to successive rectifications to successively separate nitrogen and argon in the gaseous phase and to leave a liquid concentrate containing krypton and xenon, and forming liquid nitrogen reflux liquid from the first of said successive rectifications by recompressing a portion of the separated nitrogen and liquefying it by heat exchange with a liquid product of the second of said successive rectifications.

9. The method of recovering the constituents of gaseous mixtures including principally hydrogen and nitrogen with substantial proportions of the atmospheric rare gases which comprises cooling a compressed gaseous mixture, with resultant formation of a condensate including constituents less volatile than hydrogen, collecting said condensate, withdrawing the hydrogen, rectifying the condensate to separate nitrogen in the gaseous phase from a liquid including the less volatile constituents and subjecting the liquid to an auxiliary rectification to separate argon in the gaseous phase from a liquid including the less volatile constituents, and selectively evaporating from the last-mentioned liquid a volatile fraction to leave a liquid concentrate containing krypton and xenon, and forming liquid nitrogen reflux for said rectification by recompressing a portion of the separated nitrogen and liquefying it by heat exchange with a liquid product of said second rectification.

10. The method of recovering the constituents of gaseous mixtures including principally hydrogen and nitrogen with substantial proportions of the atmospheric rare gases which comprises cooling a compressed gaseous mixture with resultant formation of a condensate including constituents less volatile than hydrogen and neon, collecting said condensate, withdrawing the gaseous residue consisting principally of hydrogen and neon and subjecting it to further cooling to separate neon in the liquid phase, withdrawing the hydrogen, rectifying the condensate to separate nitrogen in the gaseous phase from a liquid including the less volatile constituents and subjecting the liquid to an auxiliary rectification to separate argon in the gaseous phase from a liquid including the less volatile constituents, selectively evaporating from the last-mentioned liquid a volatile fraction to leave a liquid concentrate containing krypton and xenon and forming liquid nitrogen reflux liquid for the first of said successive rectifications by recompressing a portion of the separated nitrogen and liquefying it by heat exchange with a liquid product of said second rectification.

CLAUDE C. VAN NUYS.

REFERENCES CITED

The following references are of record in the file of this patent:

Hach's Chemical Dictionary.